No. 727,155. Patented May 5, 1903.

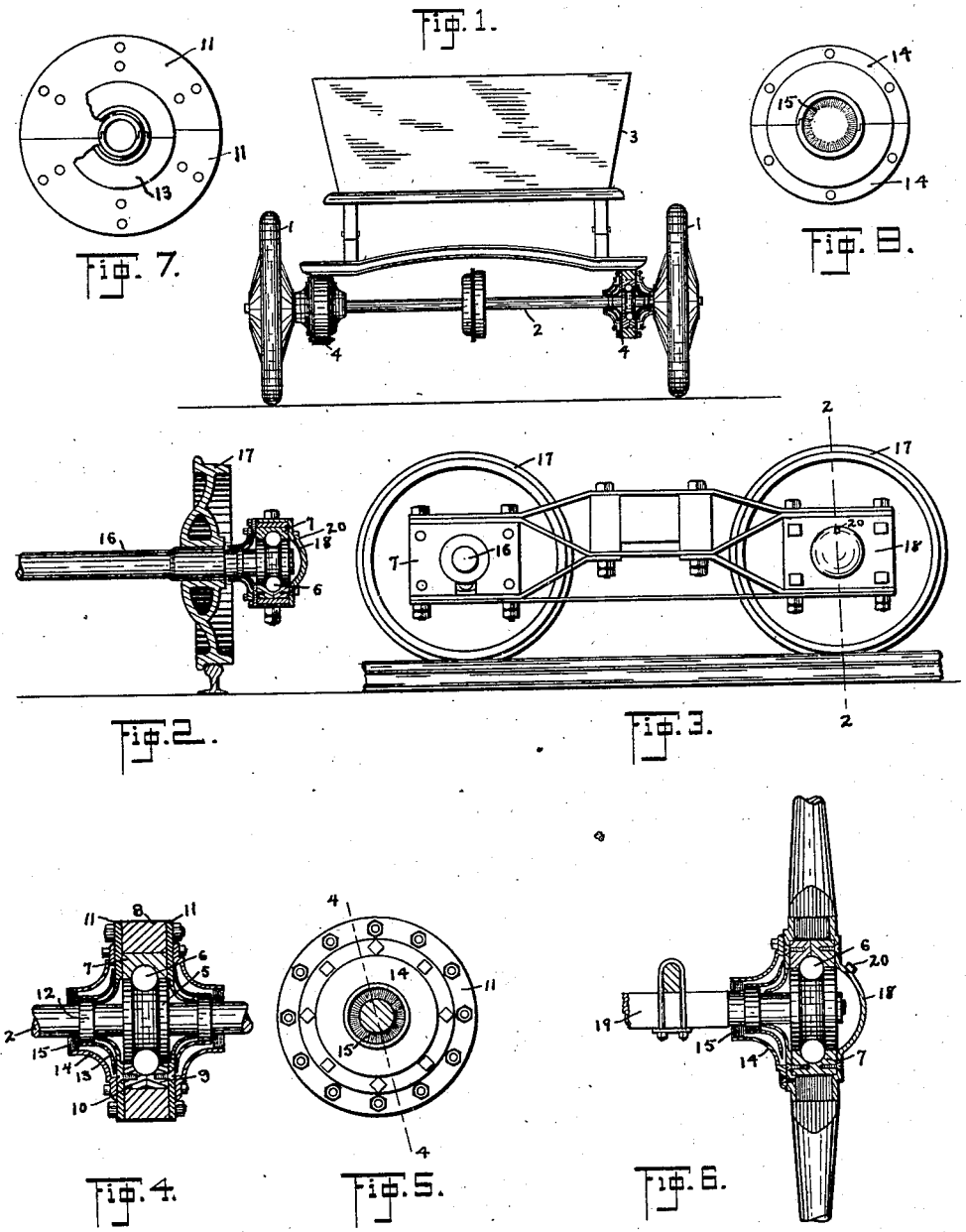

UNITED STATES PATENT OFFICE.

JOHN J. KOLLER, OF CLEVELAND, OHIO.

DUST-GUARD.

SPECIFICATION forming part of Letters Patent No. 727,155, dated May 5, 1903.

Application filed November 26, 1901. Serial No. 83,742. (No model.)

*To all whom it may concern:*

Be it known that I, JOHN J. KOLLER, a citizen of the United States, residing at Cleveland, in the county of Cuyahoga and State of Ohio, have invented a new and useful Improvement in Dust-Guards, of which the following is a specification.

This invention relates to dust-guards which are more or less general in their application, but are especially adapted for use where two parts have a relative rotating movement.

The object of the invention is to provide a device of this character which will be cheap in construction, easy of application, and which will exclude practically all dust from the parts to which they are applied. This object I attain in the structure shown in the accompanying drawings, in which—

Figure 1 shows a rear view of an automobile having my improved dust-guards applied to the bearings thereof, one of said bearings and the dust-guards being shown in section. Fig. 2 is a section through a bearing for the axle of a car-wheel, said bearing having my dust-guards applied thereto, the view being taken on the line 2 2 of Fig. 3. Fig. 3 is a side elevation of a car-truck having my dust-guards, the bearing at the left having its cover-plate removed. Fig. 4 is an enlarged sectional view of the bearing shown in Fig. 1, said view being taken on the line 4 4 of Fig. 5. Fig. 5 is a side elevation of said bearing. Fig. 6 is a sectional view through a bearing for an ordinary carriage with my dust-guards applied thereto; and Figs. 7 and 8 are modified forms of the dust-guards, showing the same made in halves.

As is well known, the rear wheels of an automobile are secured to the ends of the axle, which axle turns in bearings upon which the body of the vehicle is supported. As both of the bearings are between the wheels, it is necessary to provide each side thereof with guards to prevent the entrance of dust. As the bearings for car-axles are located outside of the wheel or on the ends of the axle, a simple form of cover-plate is all that is necessary on the outside part of the bearing. The same may be said of the journal for a carriage-wheel, the only difference between the bearings for these two forms of vehicle being that in the carriage the axle is stationary, the wheel rotating about it, while in the car-truck the wheel is secured to the axle and the latter turns in bearings.

In the drawings, in which similar reference characters designate corresponding parts throughout the several views, 1 designates the rear wheels of an automobile, which are secured to the ends of the rear axle 2.

3 is the body of the automobile, and 4 the bearings in which the axle 2 is journaled. This bearing (which is shown in detail in Figs. 4 and 5) is substantially like that set forth in my application for patent, Serial No. 58,956, and consists of a disk 5, which is secured to the shaft and which is provided with a raceway for balls 6. Surrounding the disk 5 and furnishing the outer part of the bearing is a stationary member 7, the disk being held in its position with reference thereto by the balls 6. This member is likewise surrounded by a frame-piece 8, which holds the outer part of the bearing securely in position and which form a means for attaching the vehicle-body to the bearing. As was set forth in my Patent No. 687,888, granted December 3, 1901, the balls are introduced into the raceway by removing lugs 9 and 10 from the outside member 7 of the bearing. This constitutes no part of my present invention, however, and I do not deem it necessary to describe it more particularly here. Surrounding the shaft 2 and secured to the frame-piece 8 are cover-plates 11, which curve outwardly as they approach the shaft until their inner portions are substantially tangent thereto, that portion of the cover-plate constituting a guard-plate and being indicated at 11'. The lugs 9 and 10 are preferably secured to these cover-plates. Just beyond the outer edge of the cover-plates the shaft is provided with flanges or collars 12, to which are rigidly secured the center guard-plates 13, said plates surrounding the shaft and flaring like a bell as they approach the bearing. Secured to the cover-plate 11 beyond the outer edge of the plate 13 is the outer guard-plate 14. The inner part of the cover-plate 11 and the plates 13 and 14 have the same general curvature outwardly from the bearing, so that they converge toward the shaft and overlap one another closely and to a considerable extent. This makes the only possible passage-way for dust into the bearing so long, narrow, and crooked that it is practically impossible for any dust to enter. To render the bearing more certainly dust-proof, however, I place between the outer rim of the plate 14 and the shaft a packing 15, which may be of any suitable material, although I find that a circular brush secured to the inner part of the guard-plate 14 and wiping against the shaft answers the purpose admirably. With this structure it is possible to run the bearings almost indefinitely without cleaning.

In Figs. 2 and 3 the car-axles are shown at 16 and the car-wheels at 17. The outer members 7 of the bearings are shown supported by the truss-plates of the truck in the manner common to car-bearings. The dust-guards on the side of the bearing next to the wheel are the same as those described in connection with the automobile-bearing and need not be further described here. The outer side of the bearing, however, is entirely closed against dust by a simple cover-plate 18, which is bolted, preferably, to the member 7 of the bearing. The bearing for the carriage-wheel is substantially like those already described except that the axle 19 is stationary, while the member 7 rotates about the same. As in the case of the car-axle, the bearing is on the end, and the outer portion thereof is covered by a simple cover-plate 18. The dust-guards on the inner side of the wheel are substantially the same as those described for the automobile.

As is shown in Figs. 2, 3, and 6, the cover-plates 18 bulge outwardly opposite the end of the shaft to form a chamber inside the dust-guard for oil, which may be introduced through a small hole in the cover-plate. A set-screw 20 is shown for closing this hole.

As a general rule the disks 5 are shrunk on the axles, although in the form shown in Fig. 6 it may be safely held in position by means of a nut, as shown. In most cases the dust-guard may be placed on the axles before the disks are shrunk in position, in which case they may be made continuous, as shown in Fig. 5. At times, however, it may be desirable to remove the guards or to place them on the bearings after the disks are in position. To make this possible they may be made in two or more parts, the parts overlapping each other, as shown in Fig. 7, which illustrates the plate 13 partly broken away to show the guard 11, or in Fig. 8, which shows the plate 14 with the packing or brushes 15 in position.

Having thus described my invention, what I claim as new, and desire to secure by Letters Patent, is—

1. In a device of the character described, an outer member, an inner member, a pair of dust-guards carried by said outer member, said guards being secured near their outer portions and gradually approaching the inner member, and a single dust-guard secured to the inner member and projecting between the guards forming the said pair, for the purpose specified.

2. In a device of the character described, an outer member, an inner member, one of said members having a rotative movement with reference to the other member, a pair of dust-guards carried by the outer member, said guards being secured near their outer portions and curving toward the inner member, a flange or collar on said inner member, and a dust-guard secured to said flange and projecting between the guards forming said pair, for the purpose specified.

3. In a device of the character described, an outer stationary member, a rotatable shaft passing through said member, said shaft having a flange or collar, a pair of dust-guards carried by the outer member and curving outwardly therefrom, a dust-guard secured to the flange or collar of the shaft and curving outwardly therefrom between the members of the said pair, for the purpose specified.

4. In a device of the character described, an outer member, an inner member, a dust-guard carried by said outer member, a second dust-guard carried by the inner member beyond the said first guard, a third dust-guard carried by the outer member and projecting entirely over and beyond the second dust-guard, and packing material between the third guard and the inner member, for the purpose described.

5. In a device of the character described, an outer member, an inner member, a dust-guard carried by said outer member, a second dust-guard carried by the inner member beyond the said first guard, a third dust-guard carried by the outer member and projecting beyond the second dust-guard, and a circular brush carried by the third guard and contacting with the inner member beyond the said second dust-guard, for the purpose described.

6. In a device of the character described, an outer member, a shaft passing through said outer member, said shaft having a flange or collar, a pair of dust-guards carried by the outer member and curving outwardly therefrom, a dust-guard secured to the flange or collar of the shaft and curving outwardly therefrom between the members of the said pair, said guards being formed in parts so that they may be readily put in or removed from position, and a circular brush carried by the outer guard of the said pair and contacting with the shaft beyond the flange or collar thereon, for the purpose described.

In testimony whereof I affix my signature in the presence of two witnesses.

JOHN J. KOLLER.

Witnesses:
S. E. FOUTS,
WALTER J. LISTER.